US006982529B2

(12) United States Patent
Belliveau

(10) Patent No.: US 6,982,529 B2
(45) Date of Patent: Jan. 3, 2006

(54) METHOD OF LAMP REPLACEMENT WARNING FOR IMAGE PROJECTION LIGHTING DEVICES

(76) Inventor: Richard S. Belliveau, 10643 Floral Park, Austin, TX (US) 78759

( * ) Notice: Subject to any disclaimer, the term of this patent is extended or adjusted under 35 U.S.C. 154(b) by 109 days.

(21) Appl. No.: 10/750,398

(22) Filed: Dec. 31, 2003

(65) Prior Publication Data

US 2004/0155597 A1 Aug. 12, 2004

Related U.S. Application Data

(63) Continuation-in-part of application No. 10/360,185, filed on Feb. 7, 2003.

(51) Int. Cl.
*F21V 33/00* (2006.01)
(52) U.S. Cl. .......................... 315/316; 315/318; 362/85
(58) Field of Classification Search ........ 315/291–295, 315/312, 315–318, 368.28, 383; 353/30, 353/50–53; 362/85, 272
See application file for complete search history.

(56) References Cited

U.S. PATENT DOCUMENTS

| 4,701,833 A | 10/1987 | Bornhorst .................... 362/294 |
| 5,113,332 A | 5/1992 | Richardson .................. 362/282 |
| 5,399,947 A * | 3/1995 | Washburn .................... 315/383 |
| 5,828,485 A | 10/1998 | Hewlett ....................... 359/291 |
| 5,829,868 A | 11/1998 | Hutton ........................ 362/276 |
| 5,988,817 A | 11/1999 | Mizushima et al. .......... 353/94 |
| 6,057,958 A | 5/2000 | Hunt ........................... 359/291 |
| 6,099,128 A * | 8/2000 | Jessl ............................ 353/51 |
| 6,188,933 B1 | 2/2001 | Hewlett et al. ............... 700/19 |
| 6,208,087 B1 | 3/2001 | Hughes et al. .............. 315/291 |
| 6,219,093 B1 * | 4/2001 | Perry ......................... 348/135 |
| 6,412,972 B1 * | 7/2002 | Pujol et al. ................. 362/272 |
| 6,515,435 B2 * | 2/2003 | Hughes et al. .............. 315/292 |
| 6,588,944 B2 | 7/2003 | Harris ......................... 385/88 |
| 6,605,907 B2 * | 8/2003 | Belliveau .................... 315/294 |
| 6,671,005 B1 | 12/2003 | Pujol et al. ................. 348/771 |
| 6,765,544 B1 | 7/2004 | Wynne Willson ............. 345/6 |

OTHER PUBLICATIONS

High End System Product Line 1997.
Catalyst Media in Motion, © 2002 High End Systems, Inc.

* cited by examiner

*Primary Examiner*—Wilson Lee
(74) *Attorney, Agent, or Firm*—Walter J. Tencza

(57) ABSTRACT

An apparatus is provided including an image projection lighting device. The image projection lighting device may be comprised of a base housing, a yoke, and a lamp housing. The lamp housing may be comprised of a lamp and a first light valve. The image projection lighting device may be further comprised of a communications port, a processing system, and a memory. A cutoff value representing an amount of accumulated operating time at which the lamp may begin to operate improperly may be stored in the memory. An accumulated value representing an actual accumulated amount of operating time of the lamp may also be stored in the memory. The processing system may prevent the lamp from operating when the accumulated value is within a limit of the cutoff value, unless the processing system grants a request for a variance.

8 Claims, 10 Drawing Sheets

METHOD OF LAMP REPLACEMENT WARNING FOR IMAGE PROJECTION LIGHTING DEVICES

CROSS REFERENCE TO RELATED APPLICATIONS

The present application is a continuation in part of and claims the priority of U.S. patent application Ser. No. 10/360,185, titled "Image Projection Lighting Device" filed on Feb. 7, 2003. Note that this present application, if possible, does not claim the priority of any prior patent application, such as the applications, the priority of which is claimed in Ser. No. 10/360,185. If this is not possible, then the present application does not claim the priority of any prior application.

FIELD OF THE INVENTION

The present invention relates to image projection lighting devices.

BACKGROUND OF THE INVENTION

Lighting systems in the prior art are typically formed by interconnecting, via a communications system, a plurality of lighting fixtures and providing for operator control of the plurality of lighting fixtures from a central controller. Such lighting systems may contain multiparameter light fixtures, which illustratively are light fixtures having two or more individually remotely adjustable parameters such as focus, color, image, position, or other light characteristics. Multiparameter lighting fixtures are widely used in the lighting industry because they facilitate significant reductions in overall lighting system size and permit dynamic changes to the final lighting effect. Applications and events in which multiparameter lighting fixtures are used to great advantage include showrooms, television lighting, stage lighting, architectural lighting, live concerts, and theme parks. Illustrative multi-parameter light devices are described in the product brochure entitled "The High End Systems Product Line 2001" and are available from High End Systems, Inc. of Austin, Tex.

A variety of different types of multiparameter light fixtures are available. One type of advanced multiparameter lighting fixture is an image projection lighting device ("IPLD"). Image projection lighting devices of the prior art typically use a light valve or light valves to project images onto a stage or other projection surface. A light valve, which is also known as an image gate, is a device for example such as a digital micro-mirror ("DMD") or a liquid crystal display ("LCD") that forms the image that is projected. Either a transmissive or a reflective type light valve may be used. U.S. Pat. No. 6,057,958, issued May 2, 2000 to Hunt, incorporated herein by reference, discloses a pixel based gobo record control format for storing gobo images in the memory of a light fixture. The gobo images can be recalled and modified from commands sent by a control console. A pixel based gobo image is a gobo (or a projection pattern) created by a light valve like a video projection of sorts. U.S. Pat. No. 5,829,868, issued Nov. 3, 1998 to Hutton, incorporated by reference herein, discloses storing video frames as cues locally in a lamp, and supplying them as directed to an image gate to produce animated and real-time imaging. A single frame can also be manipulated through processing to produce multiple variations. Alternatively, a video communication link can be employed to supply continuous video from a remote source.

IPLDs of the prior art use light from a projection lamp that is sent through a light valve and focused by an output lens to project images on a stage or a projection surface. The control of the various parameters of the IPLDs is affected by an operator using a central controller. In a given application, a plurality of IPLDs are used to illuminate the projection surface, with each IPLD having many parameters that may be adjusted by a central controller to create a scene.

IPLDs used in an entertainment lighting system can produce many colorful images upon the stage or projection surface. IPLDs may project images onto the projection surface such as still images, video images and graphic images. The term "content" is a general term that refers to various types of creative works, including image-type works and audio works. Content is typically comprised of still images, video images or loops and computer graphical images.

The Catalyst (trademarked) image projection lighting device manufactured by High End Systems of Austin Texas incorporates a video projector with a moveable mirror system that directs the images projected by the projector onto the stage or projection surface. A personal computer is used as a server that provides the images to the projector. A lighting controller sends command signals over a communication system to control the selection of images from the server to the projector as well as control the various functions of the video projector and the position of the image on the projection surface.

The light source (herein referred to as a lamp) used with multiparameter lights could be a halogen lamp, metal halide lamp, xenon lamp, light emitting diode or a mercury lamp. Image projection lighting devices are more likely to use a mercury lamp that is operated at high mercury vapor pressure levels exceeding 200 atmospheres. One example of a high-pressure mercury lamp used as a light source for image projection lighting devices is the UHP (Ultra-High Pressure UHP is a trademark of Royal Phillips Electronics) lamp manufactured by Royal Philips Electronics of the Netherlands.

UHP lamps have the advantage of minimum arc tube devitrification over the life of the lamp. UHP lamps can easily be operated in excess of 2000 hours and because they exhibit minimum devitrification over life, the luminous output of the image projection lighting device may only decline by 20%. This is a great advantage compared to the devitrification rates of other lamp types such as short arc metal halide that may fully devitrify over the expected life of the lamp causing an obvious greatly reduced luminous output of the image projection lighting device. The disadvantage of a high-pressure mercury lamp is that it may be operated accidentally over the rated lifetime of the lamp since a user of the image projection lighting device does not visualize a loss of luminous output towards the end of the recommended lamp life. Since the high pressure mercury lamps are operated at very high-pressure levels the chance for a catastrophic failure of the arc tube greatly increases over recommended lamp life.

In response to the possible catastrophic failure of the arc tube, manufacturers of high pressure mercury lamps have provided the lamp in an explosion resistant housing that encloses the arc tube between an integral reflector and an output aperture window. This projective enclosure helps protect the technician that handles the lamp during the changing of the lamp from an accidental explosion. The protective enclosure also helps to protect the optical components located within the image projection lighting device housing from damage should the arc tube have a catastrophic failure and the arc tube should explode.

High-pressure mercury lamps used with consumer video projectors often are managed by the microprocessing system of the projector so that a lamp replacement warning is given to the viewer of the projected image when the lamp is approaching end of lamp life. The lamp replacement warning projected image can be projected upon the projection screen by the video projector or the warning can be in the form of an indicator lamp on the video projector. The lamp replacement warning allows the viewer of the video projector to see that the high-pressure mercury lamp has reached an end of life condition and that the lamp should be replaced. The lamp replacement warning that is projected by a consumer video projector can be a desirable irritation to the observer in such that the observer is made continuously aware of the need to replace the lamp. Replacing the lamp reduces the possibility that the arc tube may explode due to long term oxidization of the lamp seals and continuous expansion and contraction of the lamp during on and off cycles.

Image projection lighting devices that use high pressure mercury lamps are often times used on theatre and rock shows where an explosion of the lamp can cause a great distraction to the viewing audience or the show's entertainers. It is difficult to project a lamp replacement warning image from the image projection lighting device during the show as the lamp replacement warning would be viewable to the audience as well as to the technicians. An indicator lamp on the housing of the image projection lighting device can be helpful; however many times the image projection lighting device is located at a remote distance from the operator of the central controller making visibility of an indicator difficult at the remote distance.

One multiparameter light of the prior art has incorporated a lamp replacement warning system by way of an LED (light emitting diode) digital display located on the housing of the light. The Technobeam (trademarked) manufactured by High End Systems (trademarked) of Austin, Texas can keep track of lamp hours during use and can keep a specific count of the hours as determined by its memory. The Technobeam (trademarked) illuminates an LED display to read "Lamp Life Err" that signifies that the lamp life of the lamp has been fully realized. The Technobeam (trademarked) will extinguish its lamp when the end of lamp life approaches and will display the message "Lamp Life Err" on an LED display located on the Technobeam (trademarked) housing. The Technobeam (trademarked) will then prohibit the user from reigniting the lamp until the lamp is replaced and the lamp hour counter is reset. Prohibiting the Technobeam (trademarked) lamp from striking does alert the lighting operator that the lamp indeed needs replacing, however if the operator unfortunately does not process a lamp to make the change there is a possibility that the show could be disrupted. Therefore the Technobeam (trademarked) system of warning an operator that a lamp is approaching end of life has not met with great success. There is a need to insure that a lamp warning is provided to the operator of an image projection lighting device that insures that the operator has time to obtain a replacement lamp while greatly reducing the possibility of interrupting a show.

SUMMARY OF THE INVENTION

The present invention in one or more embodiments provides an apparatus including an image projection lighting device. The image projection lighting device may be comprised of a base, a yoke, and a lamp housing. The lamp housing may be comprised of a lamp and a first light valve. The image projection lighting device may be further comprised of a communications port, a processing system, and a memory.

A cutoff value representing an amount of accumulated operating time at which the lamp may begin to operate improperly may be stored in the memory. An accumulated value representing an actual accumulated amount of operating time of the lamp may also be stored in the memory. The processing system may prevent the lamp from operating when the accumulated value is within a limit of the cutoff value, unless the processing system grants a request for a variance. When the processing system grants a request for a first variance, the processing system may allow the lamp to operate after the accumulated value is within the limit of the cutoff value. After the processing system grants the request for the first variance, the processing system may allow the lamp to operate for a first predetermined time.

The apparatus may be further comprised of a stand-alone control system. The request for a variance may be entered by an operator by using the stand-alone control system. The stand-alone control system may display a message indicating that the request for the first variance has been granted by the processing system.

The apparatus may be further comprised of a central controller. The variance can be requested by an operator of the central controller. The central controller may display a message indicating that the request for the first variance has been granted.

The processing system may grant a request for a second variance, After the processing system grants the request for the second variance, the processing system may allow the lamp to operate for a second predetermined time.

The apparatus may be comprised of a plurality of image projection lighting devices, each comprised of a lamp. A lamp life warning regarding any of the lamps of any of the plurality of image projection lighting devices may be sent to the central controller to the attention of an operator without operator inquiry.

The present invention, in one or more embodiments, includes a method including storing, in a memory of an image projection lighting device, a cutoff value representing an amount of accumulated operating time at which a lamp of the image projection lighting device may begin to operate improperly. The method may also include storing, in the memory, an accumulated value representing an actual accumulated amount of operating time of the lamp. The method may be further comprised of preventing the lamp from operating when the accumulated value is within a limit of the cutoff value, unless the processing system grants a request for a variance.

DETAILED DESCRIPTION OF THE DRAWINGS

Figure 1:
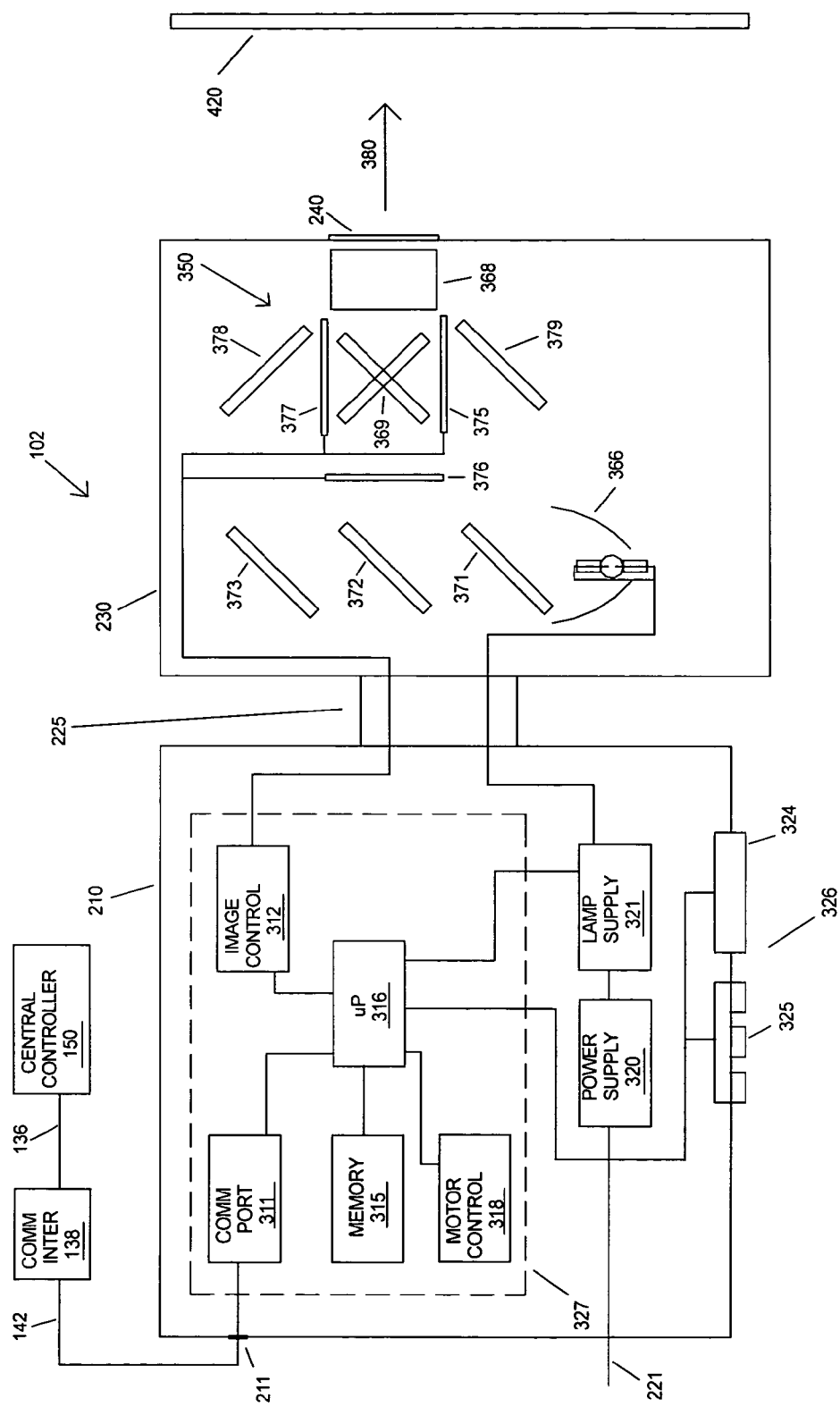
FIG. 1 shows a lamp housing, a base housing and the components therein for an image projection lighting device ("IPLD") in accordance with an embodiment of the present invention.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce the desired results. FIG. 1 is a block diagram of an embodiment of the present invention showing components within or part of the base housing 210 and within or part of the lamp housing 230 of IPLD 102. FIG. 1 also shows the central controller 150. An electronic control system 327 can be contained in the base housing 210. The electronic control system 327 is comprised of at least a processing system such as processor 316. The processor 316 may be made up of discrete electronic parts or the processor 316 may be made up of several processors. The components within or part of the base housing 210 include a communications port (shown as "comm port") 311, a connection point 211, an image control 312, a memory 315, a microprocessor or processor 316, a motor control 318, a power supply 320 and a lamp power supply 321. A bearing 225 is shown rotatably connecting the lamp housing 230 to the base housing 210, in FIG. 1, i.e. bearing 225 connects the lamp housing 230 to the base housing 210 so that the lamp housing 230 can rotate with respect to the base housing 210. Although only one bearing 225 is shown for simplification more than one bearing may rotatably connect the lamp housing 230 to the base housing 210. A display device 324 is also shown within or connected to the base housing 210. The display device 324 may be a display for alphanumeric characters or a video display capable of displaying video images. The display device 324 may also be a touch screen display that accepts input commands. An input keypad 325 is also shown within or connected to the base housing 210. The input keypad 325 together with the display device 324 can be called a stand-alone control system 326. The stand-alone control system 326 can be used to enter data and or to control the parameters of the IPLD 102. The stand-alone control system may only be comprised of the display device 324.

The components within or part of the lamp housing 230 include the lamp 366 that projects a white light to a red color separation system filter 371. The red color separation filter 371 reflects red light from the white light created by the lamp 366 to a reflecting mirror 379 where it is directed to a red light valve 375 and imaged red light passes to a color combining system 369. Blue green light passes though the red color separation filter 371 and is directed to a green color separation filter 372 that in turn reflects green light to a green light valve 376 that passes imaged green light to the color combining system 369. The green separation filter 372 passes blue light that is sent to a blue separation filter 373 and the blue light is reflected off the blue separation filter 373 and passed to a reflector 378. The reflector 378 reflects the blue light to a blue light valve 377 where the imaged blue light is directed to the color combining system 369. The order of the color separation filters may be different. Color combining system 369 combines the imaged red, green and blue light that has been imaged by the red, green and blue light valves 375, 376 and 377 respectively and passes the multicolored lighted images to a zoom and focus lens 368 where it is directed through the aperture 240 in the direction of arrow 380 to the projection surface 420. The red, blue and green light valves 375, 376 and 377 respectively, are controlled to produce images by the image control 312. The image control 312 can be a video graphics card with a memory and a graphics processor.

The central controller 150 outputs address and control commands over a communications system, which may include communications, interface 138. The communications interface 138 is connected to the communications port 311 by communications line 142 and connection point 211 as shown in FIG. 1. The communications port 311 may be a part of the processor 316. The communications port 311 can be any device capable of receiving the communication sent over the communications system. The communications interface 138 may be a router or hub as known in the communications art. The communications interface 138 may not be required for some communications systems.

The image control 312 of the electronics housing 210 provides control signals to the light valves 375, 376, and 377 in the lamp housing 230. The microprocessor 316 in the electronics housing 210 provides control signals to the image control 312. The microprocessor 316 is shown electrically connected to the memory 315. The memory 315 stores the software operating system for the IPLD 102 and possibly different types of electronic image content used to form pixel mapped images at the image control 312. The pixel mapped images are used by the image control to provide the control signals to the light valves 375, 376 and 377. The light valves shown as 375, 376 and 377 are shown as transmissive type light valves where light from the projection lamp 366 is directed to the light valves to be transmitted through the light valves 375, 376 and 377 to the lens 368. As known in the prior art a light valve can be a reflective light valve where light from the projection lamp 366 is directed to the light valves 375, 376 and 377 to be reflected from the light valves 375, 376, and 377 to the lens 368.

The motor control 318 is electrically connected to motors. The electrical connection to the motors is not shown for simplification. The motors may be stepping motors, servomotors, solenoids or any other type of actuators. The motor control 318 provides the driving signals to the motors that may be used with the lens 368 and for pan and tilt motors (not shown for simplification).

The motor control 318 is electrically connected to receive control signals from the microprocessor 316. Two power supplies are shown in FIG. 1. A power supply 320 is shown for supplying energy to the motors and may also supply power to the electronic components. A lamp power supply 321 is shown for supplying power to the main projection light source or lamp 366. The lamp power supply 321 may be signaled by the processor 316 to control the lamp 366 to be on, off or vary the power to the lamp. The lamp power supply 321 may send signals to the processor 316 as to the condition of the lamp such as on, off or if there is a fault condition. The processor 316 may keep track of the number of hours that the lamp 366 is illuminated so that data representing the total hours of illumination of the lamp 366 can be stored in the memory 316.

The IPLD 102 may include at least two different housings, such as the base or electronics housing 210 and the lamp housing 230 to facilitate remote positioning of the lamp housing 230 in relation to the base housing 210. The lamp housing 230 contains the optical components used to project light images upon a stage or projection surface 420 from the lens 368 in the direction of arrow 380, outwards from the IPLD 102. The lamp housing 230 may be connected to a bearing mechanism 225 that facilitates pan and tilting of the lamp housing 230 in relation to the base or electronics housing 210. The bearing mechanism 225 is shown simplified. The motors that would be used for pan and tilt are not shown for simplification.

Figure 2:
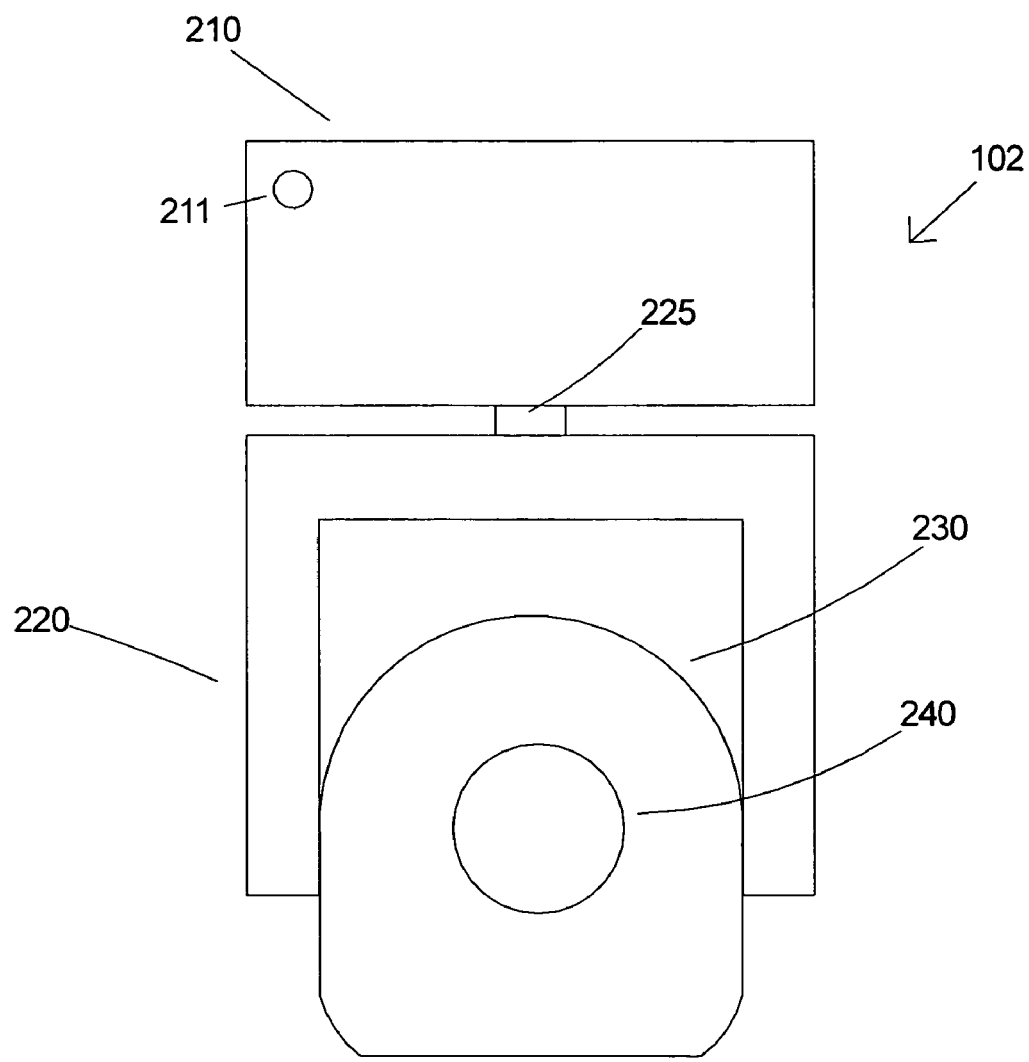
FIG. 2 shows an external view of the image projection lighting device.

FIG. 2 shows a front view of an image projection lighting device 102 incorporating one or more embodiments of the present invention. The IPLD 102 includes a base or electronics housing 210, a yoke 220, and a lamp housing 230. The IPLDs 102 and 104 of FIG. 3 may each be identical to the IPLD 102 of FIG. 2.

Figure 3:
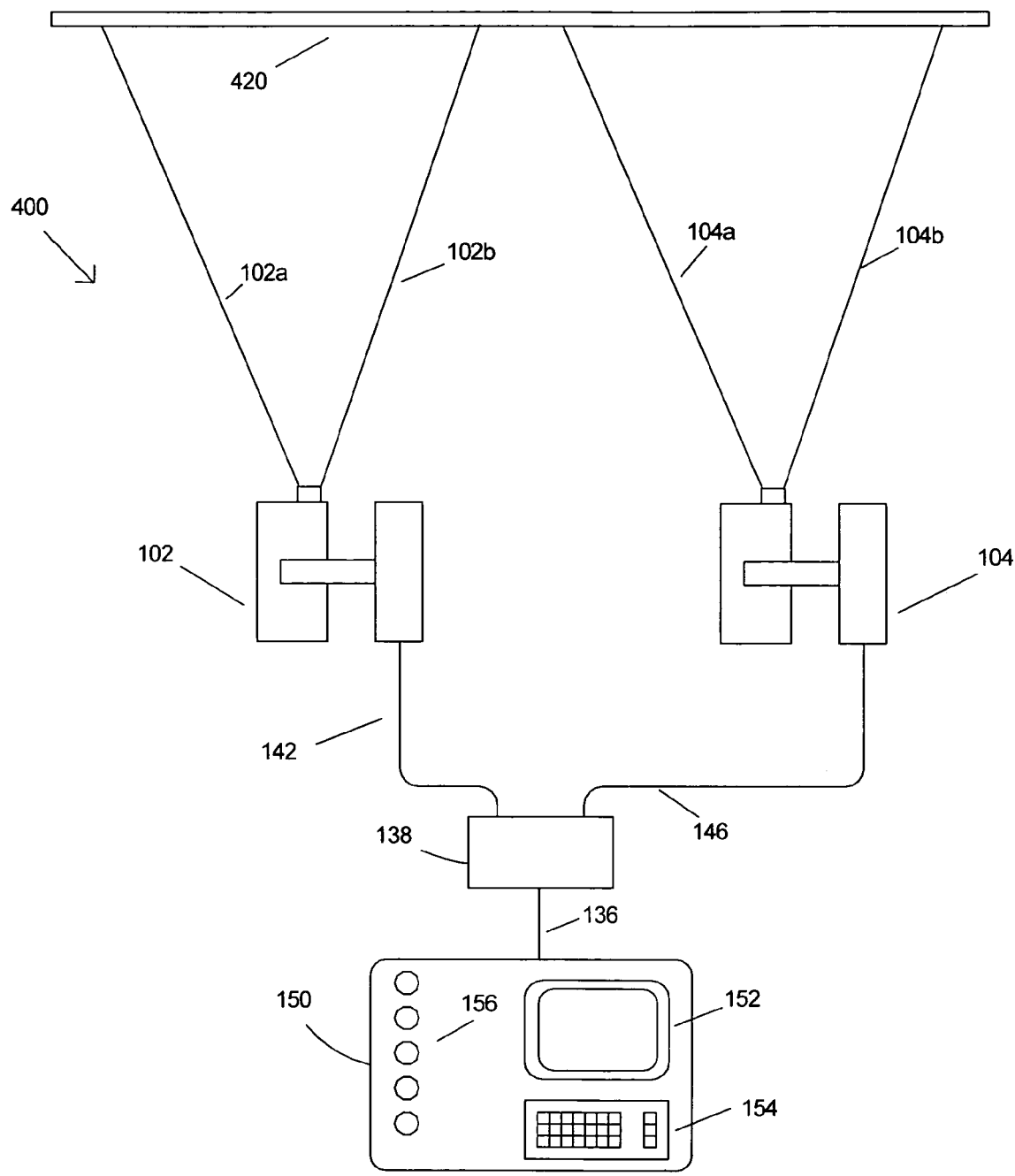
FIG. 3 shows a lighting system using two IPLDs of an embodiment of the present invention and a central controller.

The base housing 210 of the IPLD 102 includes a communications connection 211 for electrically connecting a communications line, such as communications line 142 shown in FIG. 3. The yoke 220 is physically connected to the housing 210 by a bearing 225, which allows the yoke 220 to pan or rotate in relation to the base or electronics housing 210. The lamp housing 230 is rotatably connected to the yoke 220 (bearings not shown for simplification). The lamp housing 230 typically contains optical components and light valves. An exit aperture 240 is shown for projecting lighted images from a projection lamp, such as a lamp 366 shown in FIG. 1. The projection lamp 366 shown in FIG. 1 is shown as a single lamp but it is known in the art to use two or more projection lamps working as a single projection lamp. IPLD 102 is shown with a separate base housing 210 and a lamp housing 230, however it is known in the art to produce an IPLD with a single housing using a mirror to position the projected light.

FIG. 3 shows a lighting system 400 that includes IPLDs 102 and 104. IPLDs 102 and 104 may each be functionally the same as IPLD 102 shown in FIGS. 1 and 2. Although only two IPLDs are shown for the lighting system 400 as many as one hundred or more IPLDs can be used to create a show. The central controller 150 has a keyboard entry device 154 and input devices 156 to allow an operator to input commands for controlling the IPLDs 102 and 104. The central controller 150 has a visual display monitor 152 so the operator can see the details of the show that the operator programs on the central controller 150.

Lines 102a and 102b of FIG. 3 represent the projection field of IPLD 102 as lighting images are projected upon the projection surface 420. Lines 104a and 104b of FIG. 3 represent the projection field of IPLD 104 as lighting images are projected upon the projection surface 420.

The commands entered by the operator of the central controller 150 are sent over a communications system using communications lines 136, 142, 146 and communications interface 138 to the IPLDs 102 and 104 of FIG. 3. Each IPLD has an operating address that is different than the operating address of other IPLDs so that the operator can command a specific IPLD from a plurality of IPLDs. The operating address of a specific IPLD can be stored in the memory 315 or stored as a function of the input keypad 325. The desired operating address of a specific IPLD the operator wishes to control is input into the central controller 150 by inputting to the keyboard 154 or other input device of the central controller 150. The desired operating address is sent over the communication system by the central controller 150 where it is received by the plurality of IPLDs 102 and 104. A receiving IPLD, such as IPLD 102, receives the desired operating address at the communications port 311 of FIG. 1. The received operating address is compared with the operating address stored in the memory 315 of FIG. 1 and if the received operating address matches the operating address stored in the memory 315, of IPLD 102, for example, then next the IPLD 102 is ready to receive commands from the central controller 150. Once the desired IPLD has been addressed by the operator of the central controller 150 the operator may next send commands to select a first image or vary the other parameters of the addressed IPLD. The images that are selected by the operator that can be projected by the IPLD 102 can originate from the central controller 150 or the content may originate from the memory 315 of FIG. 1.

A description of the operation of communication systems for image projection lighting devices can be found in U.S. Pat. No. 6,605,907 titled "Method, apparatus and system for image projection lighting" filed Mar. 4, 2002 and U.S. Pat. No. 6,331,756 titled "Method and apparatus for digital communications with multiparameter light fixtures" filed Dec. 8, 2001 by the inventor Richard S. Belliveau, incorporated by reference herein.

Figure 4:
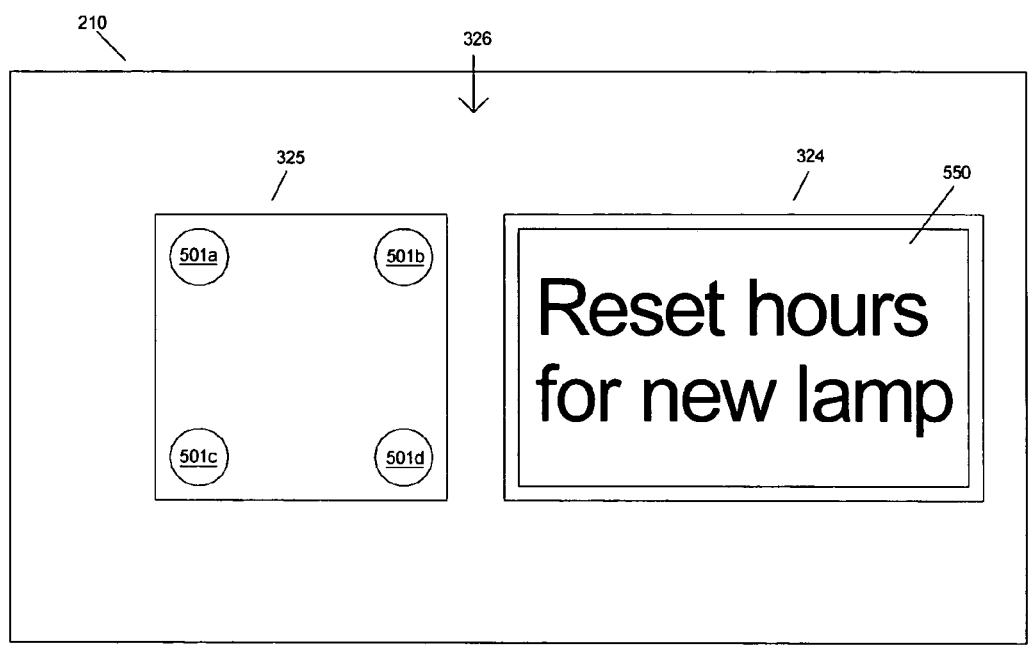
FIG. 4 shows an external view of a base housing, a stand alone control system, and a display device for use with the image projection lighting device of FIGS. 1 and 2, wherein the display device displays a first message.

FIG. 4 shows an external view of the base housing 210 and the stand alone control system 326 that comprises input keypad 325 and input keys 501a, 501b, 501c and 501d. Input keys 501a, 501b, 501c, and 501d are part of input keypad 325. Also shown is display device 324. The display device 324 may be capable of displaying text messages or images that an operator or a lighting technician can interpret. A message 550 is shown in FIG. 4, as "Reset hours for new lamp".

Figure 5:
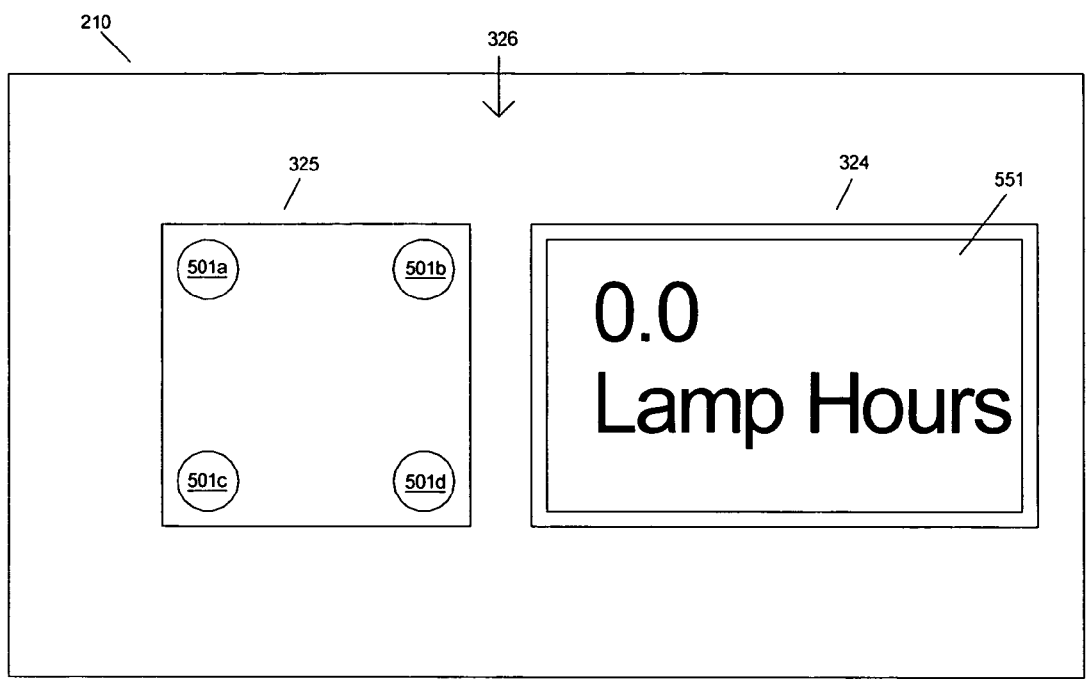
FIG. 5 shows an external view of the base housing, the stand-alone control system, and the display device of FIG. 4, however, in FIG. 5, the display device displays a second message.

When, for example, lamp 366 of FIG. 1 is new or used for zero hours the lighting technician or operator of the IPLD 102 (herein just referred to as just the operator for simplification since they may be one and the same) may use the input the stand alone control system 326 of FIG. 4 to reset the lamp hours to zero. When a new lamp, such as lamp 366 of FIG. 1, is installed into the IPLD 102, the display 324 of FIG. 4 may display a message as shown such as message 550 "Reset hours for new lamp" where upon the operator by depressing the appropriate input key or keys of keys 501a, 501b, 501c and 501d on the input keypad 326 may reset data stored in memory 315 which specifies the number of lamp hours. The data indicating the number of lamp hours may be reset to zero, indicating that the lamp 366 has been used for zero hours. FIG. 5 shows the same components of FIG. 4 however the data in memory 315 indicating the number of lamp hours have been reset by the operator to zero (0.0), indicating that the lamp 366 has been used for 0.0 hours as shown by the message 551. The message 551 specifies "0.0 Lamp Hours".

If, for example, the lamp 366 of FIG. 1 has a rated life of one thousand hours, the lamp 366 will need to be replaced at close to one thousand hours to avoid the possibility of explosion. The rated hours of a lamp are usually determined by the manufacturer of the lamp itself. It is also possible for the manufacture of the IPLD to determine the rated hours of a lamp to avoid explosion. In any case the rated hours of a lamp is the number of useful hours that the lamp can operate before replacement is required.

Figure 6:
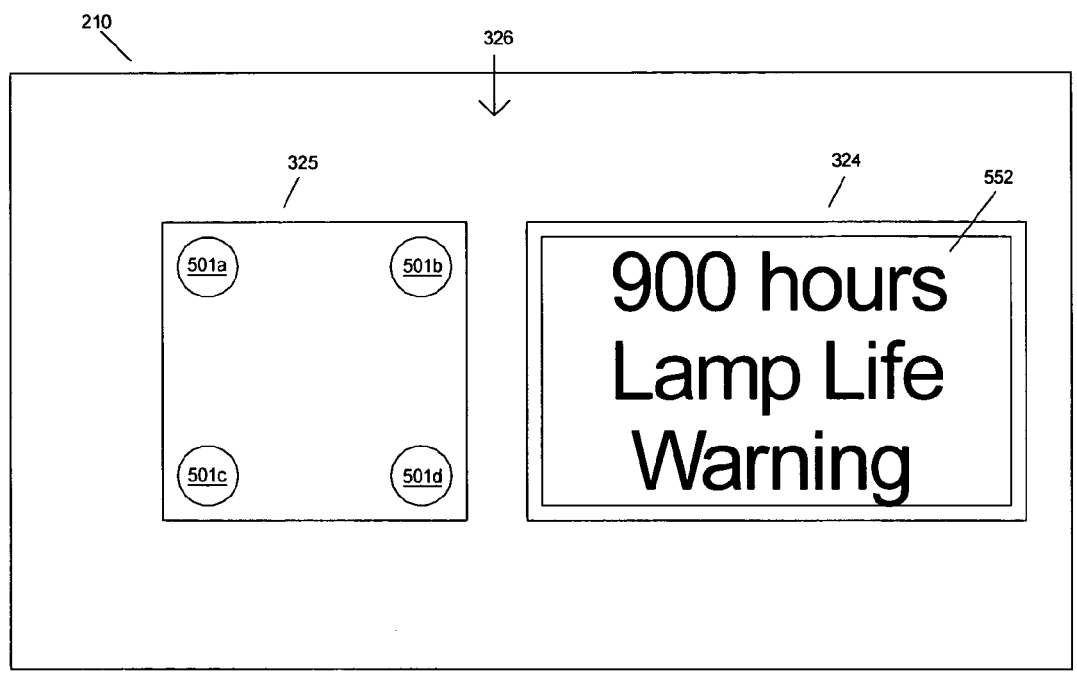
FIG. 6 shows an external view of the base housing, the stand alone control system, and the display device of FIG. 4, however, in FIG. 6, the display device displays a third message.

During operation of the IPLD 102 when the lamp 366 is illuminated to project images such as on the projection surface 420 of FIG. 4 the lamp 366 accumulates hours of operation. The processor 316 stores data corresponding to these lamp hours or time as data in the memory 315 of FIG. 1 as the lamp hours accumulate. The processor 316 may monitor the lamp hours (or time) by signals sent to or received by the lamp power supply 321. If the lamp, such as lamp 366, is rated at one thousand hours and the data saved in the memory 315 indicates an accumulation of nine hundred hours the processor 316 may first send a lamp life warning message to be displayed on the display 324. FIG. 6 shows the same components of FIG. 4 however in FIG. 6, the display 324 displays a message 552, which shows an example of a lamp life warning message. The lamp life warning message 552 may be displayed on the display 324 for up to fifty more hours of use. The lamp life warning message 552 may continue to show the hours accumulated. The operator of the IPLD 102 may see from the central controller 150, shown in FIG. 3 that the display 324 of IPLD 102 is showing the warning. This is not however guaranteed as the electronics housing 210 of IPLB 102 may be positioned away from the operator's sight. It is also possible for the processor 316 to send the lamp warning message over the communication system from the communications port 311 over wires 142, communications interface 138 and wires 136 to the central controller 150 for directing a message to the operator of the central controller 150. The lamp life warning message can be displayed by the display 152 of the central controller 150, shown in FIG. 3 before the show begins as a warning to the operator that the lamp hours, for the lamp 366, for example, are reaching close to the rated life. IPLDs 102 and 104 of FIG. 3 may both automatically without operator inquiry report their lamp life warning message over the communications system to the central controller 150. Although a wired communications system is shown any communications system such as power line control or radio frequency may be used.

The lamp life warning may be displayed by both the display 324 of IPLD 102 and by the display 152 of the central controller 150. It is best for the lamp life warning to be displayed automatically on the display 152 upon power up or initialization of the central controller 150. It would also be preferable to show the lamp life warning on the display 152 of central controller 150 when a connection is established between the central controller 152 and any IPLD such as IPLD 102. Instead of a visually displayed lamp life warning it is possible to use an audible warning emitted from a speaker or transducer (not shown) connected to the central controller 150.

Unfortunately the lamp life warning provided on the display 152 of central controller 150 may not be enough to insure that the operator replaces the lamp 366 to avoid a possible explosion when the lamp approaches the end of life. If the operator does not adhere to the lamp life warnings and replace the worn lamp 366 with a new lamp an explosion of the worn lamp 366 may occur. It will be necessary to prohibit the lamp 366 from operation when the processor 316 determines from data stored memory 315 that a certain amount of operating hours of the lamp 366 have been accumulated. The point in time at which the lamp 366 is prohibited from igniting or from operating by the processor 316 is predetermined by the operating system code stored in the memory 315. This point in time can be called "the cut off point". For example if the cut off point is set at nine hundred and fifty lamp hours the processor 316 can prohibit the lamp 366 from igniting if the lamp 366 has already accumulated at least nine hundred and fifty hours of operation. For IPLDs using arc lamps it is best to prohibit the lamp from igniting when the cut off point has been reached so as to avoid shutting the lamp off while it is operating. In any case it is best to not allow the IPLD to shut down the lamp, such as lamp 366, when the lamp is operating. It is best to wait until after the lamp 366 has been shut down, for example after a show, to initiate prohibiting operation of the lamp. The processor 316 may be directed by the operating system, as stored in the memory 315, not to send a signal to the lamp power supply 321 that would operate the lamp 366.

Figure 7:
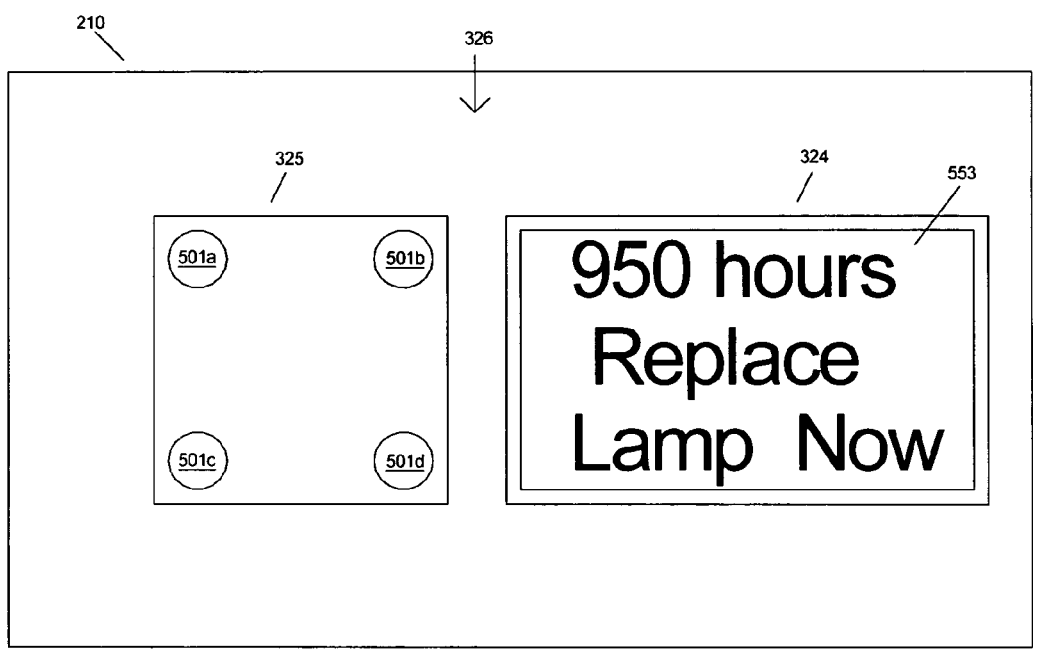
FIG. 7 shows an external view of the base housing, the stand alone control system, and the display device of FIG. 4, however, in FIG. 7, the display device displays a fourth message.

When the processor 316 prohibits the operation of the lamp 366 because the lamp 366 has accumulated close to the lamp's rated hours this can be displayed by the display 324 by message 553 "950 hours Replace Lamp Now" as shown in FIG. 7. The processor 316 of IPLD 102 may also send commands over the communications system from the communication port 311 to the central controller 150. The commands may cause the message 553 to be displayed on the display 152 or just the message "Replace Lamp Now"

By prohibiting the worn lamp 366 from accumulation of further operating hours an explosion is avoided however if the operator does not have a spare lamp to replace the worn lamp then there could be an interruption of the show. This is situation avoided by allowing the operator a variance for further operation of the worn lamp if the operator does not have a spare lamp. If the IPLD 102 is prohibited by the processor 316 from causing ignition of the worn lamp, the operator may enter commands for a request for a variance into the keypad 325 shown in FIG. 7 by using any of the appropriate input keys 501a, 501b, 501c and 501d. When the request for a variance is entered into the keypad 325, the processor 316 may allow an additional number of hours to be accumulated by the worn lamp 366. The request for a variance may also be allowed by the operator entering the appropriate commands into the input devices 154 or 156 of the central controller 150 shown in FIG. 3. The central controller 150 would then transmit the appropriate commands over the communications system to be received by the communications port 311 of FIG. 1. The communications port 311 may send the request for a variance command to the processor 316. The processor 316 may grant the request for variance as determined by the operating system stored in the memory 315. The request for a variance command may allow the lamp 366 to accumulate an additional twenty-five hours. During the variance time period it is hoped that the operator may use this time to procure a replacement lamp. This allows the show to continue without an interruption until a replacement lamp can be found.

Figure 8:
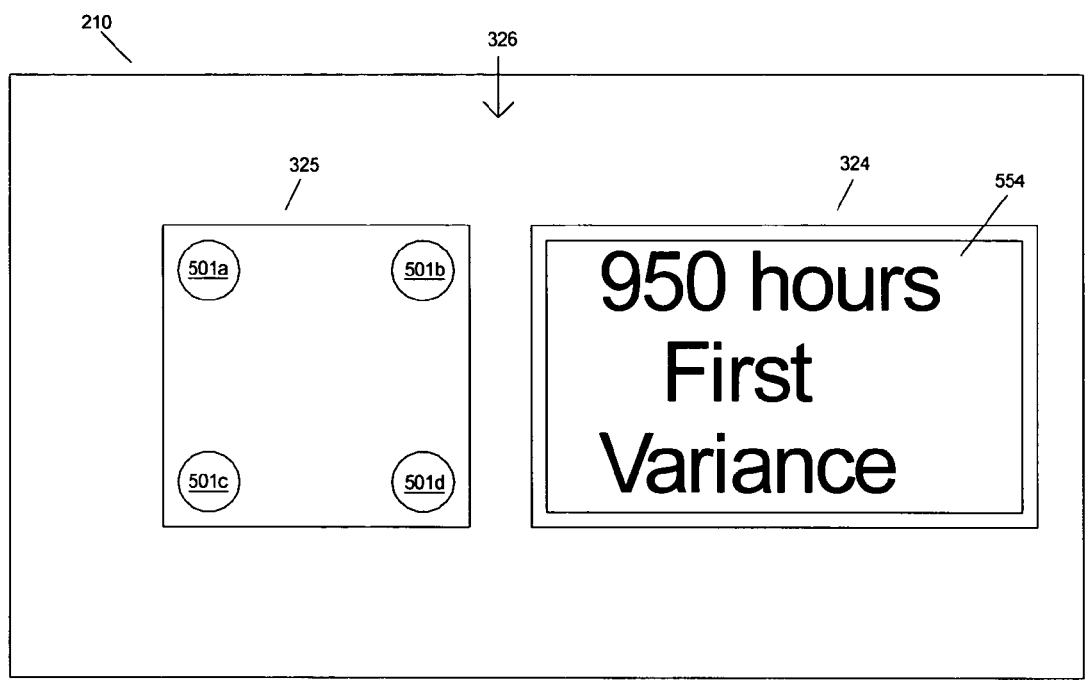
FIG. 8 shows an external view of the base housing, the stand alone control system, and the display device of FIG. 4, however, in FIG. 8, the display device displays a fifth message.

Either or both of the displays 324 shown in FIG. 8 or display 152 of the central controller 150 shown in FIG. 3 may display that the first variance has been granted. FIG. 8 shows a message 554 that displays the lamp hours and that the first variance has been granted. The message 554 may be, for example, "950 hours First Variance". FIG. 8 shows all the same components as FIG. 4 except the display 324 shows message 554.

As the additional twenty-five hours as allowed by the first variance accumulate they are stored as data in the memory 315. After the additional twenty-five hours have been accumulated by the worn lamp 366 the processor 316 referencing the memory 315 may again prohibit the worn lamp 366 from igniting.

Figure 9:
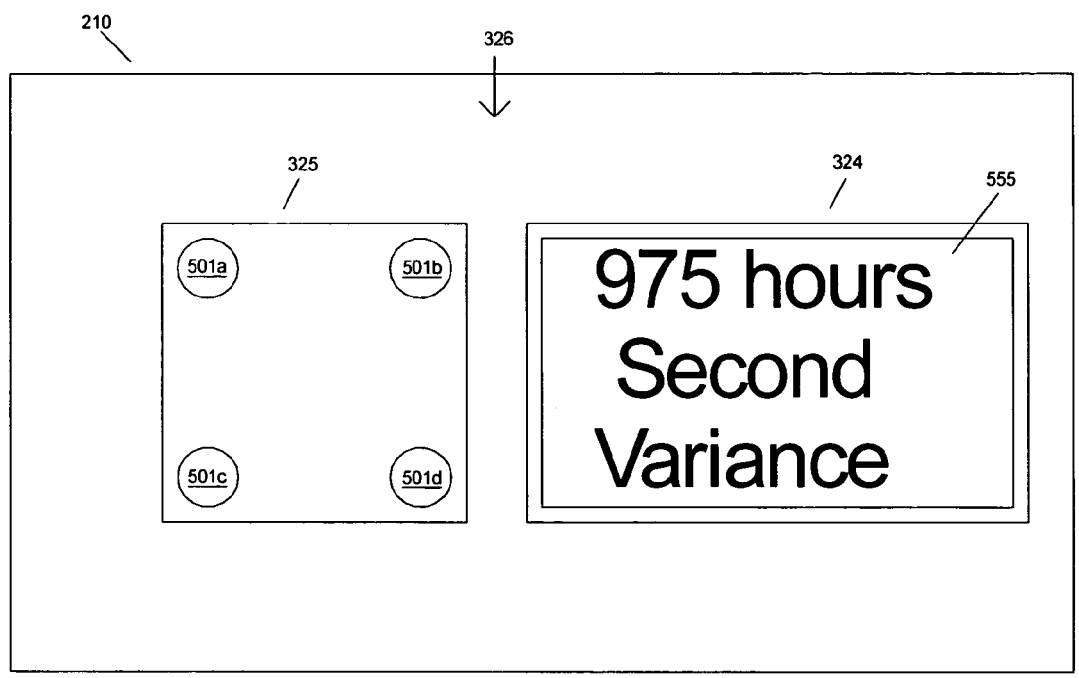
FIG. 9 shows an external view of the base housing, the stand alone control system, and the display device of FIG. 4, however, in FIG. 9, the display device displays a sixth message.

The operator may request a second variance for an additional twenty-five hours. The operator may input to the input keypad 325 shown in FIG. 8 or input devices 154 or 156 of the central controller 150 as described in the actions of requesting the first variance. The display 324 of IPLD 102 may show the number of hours and that the second variance has been allowed. FIG. 9 shows the display 324 with the message 555 that shows the lamp hours and that a second variance has been allowed. The message 555 states "975 hours Second Variance". FIG. 9 shows all the same components as in FIG. 4 except the display 324 shows the message 555. The processor 326 of FIG. 1 may also send commands from the communications port 311 over the communications system to display that the second variance has been allowed on the display 152 of the central controller 150 of FIG. 3.

Figure 10:
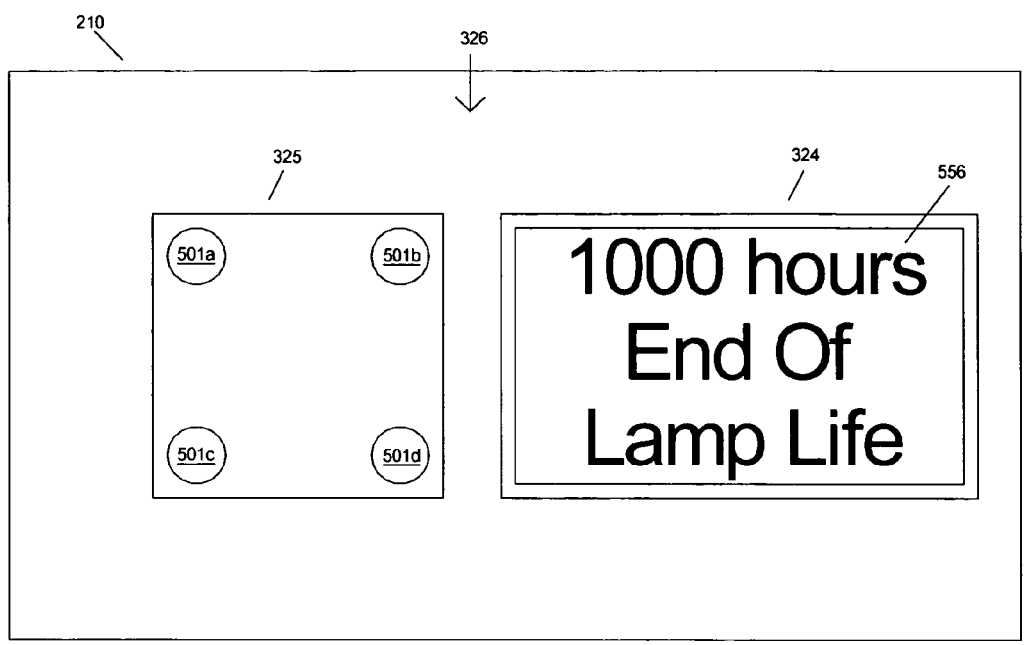
FIG. 10 shows an external view of the base housing, the stand alone control system, and the display device of FIG. 4, however, in FIG. 10, the display device displays a seventh message.

The second variance may also allow the worn lamp 366 to accumulate additional hours. For example, the second variance may allow the worn lamp to accumulate an additional twenty-five hours. Again, the accumulated additional hours are stored as data in the memory 315 shown in FIG. 1. The second variance again provides the operator with an extended time period of twenty-five hours to procure a replacement lamp. When the worn lamp 366 accumulates the additional twenty-five hours as determined by the processor 316 and the memory 315, the lamp 366 may be at the end of its life and no more variances may be allowed. The processor 316 may then not allow the worn lamp 366 to ignite or operate. The processor 316 may send control signals to the display 324 to show the message 556 "1000 hours End Of Lamp Life" as shown in FIG. 10. FIG. 10 shows all the same components as FIG. 4 except the display 324 shows the message 556. The processor 316 of FIG. 1 may also send commands from the communications port 311 over the communications system to display that the lamp is now at end of life on the display 152 of the central controller 150 of FIG. 3.

The request for variances help to provide the operator time with which to procure a replacement lamp yet helps insure that the worn lamp 366 avoids operation over the rated life.

The messages described are by way of example only and the messages displayed to the operator may be comprised of different words or sounds. Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising
an image projection lighting device comprising:
a base; a yoke;
a lamp housing;
the lamp housing comprising
a lamp,
and a first light valve;
a communications port;
a processing system;
a memory;
wherein a cutoff value representing an amount of accumulated operating time at which the lamp begin to operate improperly is stored in the memory;
wherein an accumulated value representing an actual accumulated amount of operating time of the lamp is stored in the memory;
wherein the processing system prevents the lamp from operating when the accumulated value is within a limit of the cutoff value, unless the processing system grants a request for a variance;
wherein when the processing system grants a request for a first variance, the processing system allows the lamp to operate after the accumulated value is within the limit of the cutoff value.

2. The apparatus of claim 1
wherein when the processing system grants the request for the first variance, the processing system allows the lamp to operate for a first predetermined time.

3. The apparatus of claim 1 further comprising;
a stand alone control system;
and wherein the request for a variance is entered by an operator by using the stand alone control system.

4. The apparatus of claim 3 wherein
the stand alone control system displays a message indicating that the request for the first variance has been granted by the processing system.

5. The apparatus of claim 1 further comprising
a central controller; and
wherein a variance can be requested by an operator of the central controller.

6. The apparatus of claim 5 wherein
the central controller displays a message indicating that the request for the first variance has been granted.

7. The apparatus of claim 2 further comprising
wherein when the processing system grants a request for a second variance the processing system allows the lamp to operate for a second predetermined period of time after the accumulated value is within the limit of the cutoff value.

8. A lighting system comprising
a plurality of image projection lighting devices;
and a central controller;
wherein each of the image projection lighting devices comprises:
a base;
a yoke;
a lamp housing;
the lamp housing comprising
a lamp,
and a first light valve;
a communications port;
a processing system; and
a memory, wherein an accumulated value representing an accumulated amount of operating time of the lamp is stored in the memory;
and wherein a lamp life warning regarding any of the lamps of any of the plurality of image projection lighting devices is sent to the central controller to the attention of an operator without operator inquiry.

* * * * *